US008676752B2

(12) United States Patent
Kundu et al.

(10) Patent No.: US 8,676,752 B2
(45) **Date of Patent: *Mar. 18, 2014**

(54) TECHNIQUES FOR THE LOG-BASED REPLICATION OF HIGH-LEVEL PROCEDURES

(75) Inventors: Joydip Kundu, Derry, NH (US); Anthony Adams, Mason, NH (US); Goutam Kulkarni, Nashua, NH (US); Roger MacNicol, Hollis, NH (US); Douglas Voss, Nashua, NH (US); Qinqin Wang, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,918

(22) Filed: Nov. 9, 2011

(65) Prior Publication Data

US 2012/0059792 A1 Mar. 8, 2012

Related U.S. Application Data

(63) Continuation of application No. 11/954,583, filed on Dec. 12, 2007, now Pat. No. 8,086,564.

(51) Int. Cl.
*G06F 7/00* (2006.01)
*G06F 17/00* (2006.01)

(52) U.S. Cl.
USPC .......... 707/610

(58) Field of Classification Search
USPC .......... 707/610
See application file for complete search history.

(56) References Cited

U.S. PATENT DOCUMENTS

| | | | | |
|---|---|---|---|---|
| 6,067,542 | A * | 5/2000 | Carino, Jr. | 1/1 |
| 6,678,704 | B1 * | 1/2004 | Bridge et al. | 1/1 |
| 6,732,124 | B1 * | 5/2004 | Koseki et al. | 1/1 |
| 6,980,988 | B1 * | 12/2005 | Demers et al. | 1/1 |
| 7,003,694 | B1 | 2/2006 | Anderson, Jr. | |
| 7,222,136 | B1 * | 5/2007 | Brown et al. | 707/683 |
| 7,236,993 | B2 * | 6/2007 | Brown et al. | 707/604 |
| 7,305,421 | B2 | 12/2007 | Cha | |
| 2002/0184239 | A1 * | 12/2002 | Mosher et al. | 707/200 |
| 2004/0098425 | A1 | 5/2004 | Wiss | |
| 2004/0148316 | A1 | 7/2004 | Bridge, Jr. | |
| 2004/0210577 | A1 | 10/2004 | Kundu | |
| 2004/0210606 | A1 | 10/2004 | Brown | |
| 2005/0262170 | A1 | 11/2005 | Girkar | |
| 2005/0289174 | A1 | 12/2005 | Kolli | |
| 2006/0004838 | A1 | 1/2006 | Shodhan | |

(Continued)

*Primary Examiner* — Robert Beausoliel, Jr.
*Assistant Examiner* — Michael Pham
(74) *Attorney, Agent, or Firm* — Vista IP Law Group, LLP

(57) ABSTRACT

A method and system that annotates a redo log to provide information concerning the execution of a procedure at a primary database. The annotations include entry and exit markers that indicate the beginning and the end of the execution along with any arguments passed to the procedure, and whether the execution of the procedure was successful. At the standby database, these markers are used to create a logical transaction associated with the procedure. The operations performed by the procedure are grouped into individual transactions, and these individual transactions are grouped as belonging to the logical transaction. If the execution of the procedure was successful at the primary database, then the individual transactions are discarded, and the logical transaction is applied by executing the procedure at the standby database. If the execution of the procedure failed at the primary database, then the individual transactions and the logical transaction are discarded.

19 Claims, 13 Drawing Sheets

(56) References Cited

U.S. PATENT DOCUMENTS

| | | | | |
|---|---|---|---|---|
| 2006/0101081 | A1* | 5/2006 | Lin et al. | 707/200 |
| 2006/0101083 | A1* | 5/2006 | Cherkauer et al. | 707/200 |
| 2007/0100912 | A1 | 5/2007 | Pareek | |
| 2007/0124348 | A1 | 5/2007 | Claborn | |
| 2007/0162511 | A1* | 7/2007 | Venkatesan et al. | 707/200 |
| 2007/0168704 | A1 | 7/2007 | Connolly | |
| 2007/0192384 | A1 | 8/2007 | Shodhan | |
| 2007/0198700 | A1 | 8/2007 | Vivian | |
| 2008/0034014 | A1* | 2/2008 | Beck et al. | 707/204 |

* cited by examiner

Common Fields for Entry and Exit Markers Structure Definition

| Field Name | Description |
|---|---|
| ChgVecType | Change Vector Type of record; possible types include first entry marker, exit marker, and subsequent entry marker |
| MergeFlag | Record = exit marker → both bits set;<br>Record = entry marker, no arguments → both bits set<br>Record = 1st entry marker, arguments →first bit set only<br>Record = last entry marker, arguments →second bit set only |
| firstSegCol | If argument data associated with multiple columns, value is 1st column's number; used by LogMiner in creating LCR's; non-zero value only if change vector type is subsequent entry marker |
| opcode | Operation code; used by LogMiner in creating LCR's, to set operation field; values are 'enter' or 'exit' |
| XID | Transaction identifier in which marker is dropped |

FIG. 5a

Other Fields for 1st Entry Marker and Exit Marker Structure Definition

| Field Name | Description |
|---|---|
| stealthXID | Stealth transaction identifier; special empty transaction started and committed if procedure is called with current action transaction; only gets used if procedure does commit as first bit of work |
| exitStatus | Exit status of procedure; value is non-zero only for exit marker |
| pragmaop | Pragma option specified in procedure; possible values include 1 = supported, 2 = manual, and 3 = auto |
| flags | Information about pragma-d procedure; possible values include 1 = autonomous procedure and 2 = definer's rights |
| ownernm | Owner name for procedure |
| pkgnm | Procedure package name |
| procnm | Procedure name |
| logged in username | User name of logged in user |
| default/current schema | Name of default or current schema |

FIG. 5b

Other Fields for Subsequent Entry Marker Structure Definition

| Field Name | Description |
|---|---|
| name | Argument name |
| mode | Argument mode; possible values include: 1=IN (input argument); 2=OUT (output argument); 3=RETURN (return argument); and 4=INOUT (input and output argument) |
| maxsize | Maximum size of an OUT parameter |
| dtytype | DTY data type |
| objtype | (future use) |
| csetform | Character set form, NLS |
| csetid | Character set ID, NLS |
| data | Actual argument data |
| | |
| name | ... |
| mode | ... |
| maxsize | ... |
| dtytype | ... |
| objtype | ... |
| csetform | ... |
| csetid | ... |
| data | ... |
| | |
| . . . | . . . |

FIG. 5c

Logical Change Record (LCR) Structure Definition

| Field Name | Description |
|---|---|
| Operation | User-level operation (liked INSERT, UPDATE, DELETE, DDL etc) associated with this LCR; if LCR for procedure, then operation = 'entry' or 'exit' |
| Num_pcr | Number of PCRs associated with this LCR |
| XID | Transaction identifier associated with this LCR. This is the same for all LCRs associated with the same transaction. |
| LXID | Logical transaction identifier associated with procedure causing operation. |
| Object_number | Each LCR is associated with the change made to base database object (this refer to the internal number that is associated with a database table) |
| Object_version | The version determines the base database object definition (like how many columns the base table contains etc) |
| Low_scn | An LCR can be made of different "redo records". The low_scn is the SCN of the earliest "redo record" associated with the LCR. |
| High_scn | An LCR can be made of different "redo records". The high_scn is the SCN of the latest "redo record" associated with the LCR. |
| Property | Other information about the LCR |
| PCR_ptr | Pointer to this LCR's PCRs; if LCR for procedure, then points to argument data |

FIG. 8a

Fields for argument data pointed to by LCR

| Field Name | Description |
|---|---|
| own | Owner information for procedure |
| pkg | Procedure package information |
| proc | Procedure name |
| logusr | User name of logged in user |
| defusr | Default user |
| | |
| name | Argument name |
| mode | Argument mode; possible values include: 1=IN (input argument); 2=OUT (output argument); 3=RETURN (return argument); and 4=INOUT (input and output argument) |
| maxsize | Maximum size of an OUT parameter |
| dtytype | DTY data type |
| objtype | (future use) |
| csetform | Character set form, NLS |
| csetid | Character set ID, NLS |
| data | Actual argument data |
| | |
| name | ... |
| mode | ... |
| maxsize | ... |
| dtytype | ... |
| objtype | ... |
| csetform | ... |
| csetid | ... |
| data | ... |
| | |
| .<br>.<br>. | .<br>.<br>. |

801 (rows name through data)

FIG. 8b

TECHNIQUES FOR THE LOG-BASED REPLICATION OF HIGH-LEVEL PROCEDURES

CROSS-REFERENCE TO RELATED APPLICATIONS

This application is a continuation of U.S. application Ser. No. 11/954,583, filed on Dec. 12, 2007, which is hereby incorporated by reference in its entirety for all purposes.

BACKGROUND OF THE INVENTION

1. Field of the Invention

This invention relates generally to the redo logs used in database systems to log the transactions performed by the database system and more specifically to the replication of procedure calls using the redo logs at a standby database.

2. Description of Related Art

Nowadays, most businesses, governments, and large organizations are completely dependent on their database systems. If the database system fails, the organization cannot operate. Because organizations depend so completely on their database systems, the database systems must be reliable. One way in which reliability is achieved in database systems is careful design to reduce hardware and software failures; another is redundancy of hardware and data so that hardware and software failures do not result in loss of data or of service; still another is recoverability, so that when a failure does occur, the database system can be restarted without loss of data. A technique that is commonly used to achieve recoverability is logging; whenever the database system performs a transaction, it logs the results of the operations making up the transaction in a file. The result of the logging operation is a transaction log that records operations belonging to a stream of transactions performed by the database system. When a failure occurs, the transactions in the stream that were performed up to the point of the failure can be recovered by redoing the operations specified in the log file. For this reason, such transaction logs are often termed redo logs.

While redo logs were originally developed to permit recovery from failures, both the designers of the database systems and their users soon realized that the information contained in the logs could be put to other uses. There are two broad categories of such uses: data mining and replication. Data mining takes advantage of the fact that a redo log necessarily contains a complete record over the period during which the redo log was made of the operations performed by the database system on the data stored in the database system. One use of such information is to tune the database system for more efficient performance; another is to analyze the kinds of transactions being made by users of the database system over a particular period. For example, if the database system keeps track of the sales of items of merchandise, the redo log could be examined to see whether a TV promotion of a particular item of merchandize had any immediate effect on sales of the item.

Replication is an extension of the original purpose of the redo log. When a redo log is used for recovery, what is actually done is that the database system is put into the condition it was in at the point at which the redo log begins and the operations that are recorded in the redo log are replicated in the database system. In the same manner, the redo log can be used to propagate changes to other database systems. For example, if an organization has a main personnel database system at headquarters and local personnel database systems at various branches, the redo log from the main database system can be used to replicate the operations performed at the main database system in each of the branch database systems, so that what is in the local database systems continues to correspond to what is in the headquarters personnel database system.

Originally, the information in the redo logs was copied from the database system at an extremely low level. For example, in relational database systems, the data in the database systems is organized into tables. Each table has a name by which it is known in the database system. Each table further has one or more named columns. When the table contains data, the table has one or more rows, each of which contains fields corresponding to each of the columns. The fields contain data values. The data base system's tables are in turn defined in other tables that belong to the database system's data dictionary. To perform an operation in a database system, one specifies the operation in terms of table names and column names. The actual data specified in the tables is, however, contained in data blocks in the database system, and whenever data was changed in the database system, a copy of the changed data block was written to the redo log.

Someone needing to mine logs could begin with a copy of data from a redo log and use information from the data dictionary to determine what table the changed data belonged to and from the kind of change what kind of database operation had been performed, but doing so was time consuming and mistake prone. Also, the fact that the changes were recorded at the data block level meant that the redo log could be used for replication only in database systems that were substantially identical to the one in which the redo log had been made.

To make redo logs easier to use for data mining and replication, database system designers developed software to mine the redo logs to produce a sequence of equivalent logical operations in memory. This process not only indicates what change had been made, but also described the operation in terms of a query language command and the names of the tables and columns affected by the operation. This makes redo logs much easier to analyze, and as long as a particular database system can perform the logical operations, a replica of a set of changes can be made in the particular database system.

FIG. 1 illustrates a system that uses the redo log for replication. The system includes a primary database 101 and a standby database 106. The primary database 101 is a production database that functions in the primary role. This is the database that is accessed by most applications that use the system. The standby database 106 is a transactionally consistent copy of the primary database 101. The primary database 101 and the standby database 106 can be at any locations, as long as they can communicate with each other. Stream of transactions performed on a primary database 101 are recorded in a redo log 102. The data in the redo log 102 are transmitted in a redo stream 103 to the standby database 106. A LogMiner utility 104 at the standby database 106 processes the redo log 102 and produces a sequence of equivalent logical operations 105 in memory. The logical operations 105 are then applied to the standby database 106.

While the use of logical operations have made the replication of a database much easier, problems still remain. First, many administrative functions performed at the primary database 101 are typically accomplished through the use of procedures. A procedure is a schema object that includes SQL statements and constructs that execute as a unit to solve a specific problem or perform a set of related tasks. Procedures permit the caller to provide arguments that can be input only, output only, or input and output values. Procedures are not restricted to administrative purposes but may also include business procedures and consequently be an integral part of business applications. Changes caused by a procedure typically span over multiple transactions. These transactions should either be applied or not applied at the standby database 106 as a whole. However, only changes to individual data blocks are recorded in the redo log 102. The standby database 106 would have no knowledge that a set of changes are associated with the same procedure. Thus, if there was a failure before the procedure completed at the primary database 101, there is no reliable way to rollback from the failed procedure as a whole. Second, the changes caused by the procedure and recorded in the redo log 102 may refer to local metadata, which may not be identical at the standby database 106. So the re-creation of the individual logical operations 105 generated from the redo log 102 may not lead to the same result at the standby database 106.

It is an object of the techniques disclosed herein to solve these and other problems of redo logs and replication of procedures at standby databases. These techniques are equally applicable to both administrative and business procedures.

BRIEF SUMMARY OF THE INVENTION

A method and system of the invention annotates a redo log to provide information concerning the execution of a procedure at a primary database. In one aspect, a method according to the invention provides a redo log at the primary database is annotated to support replication of the procedure at a standby database. When the procedure executes at the primary database, one or more entry markers are written into the redo log, the entry markers comprising: procedure information, argument data for the procedure if any, and a corresponding transaction identifier. A plurality of redo records are then written into the redo log, each redo record comprising a copy of a change to the primary database and a corresponding transaction identifier. A procedure may execute a plurality of transactions each with a different transaction identifier. When the procedure is done executing, an exit marker is written into the redo log, the exit marker comprising an exit status for the procedure.

In another aspect, a system according to the invention comprises a primary database, comprising a system table for storing data blocks; and a file system comprising code for running the primary database, wherein when executed, the code creates an annotated redo log. The annotated redo log comprises one or more entry markers written into the annotated redo log when the procedure begins executing at the primary database. The entry markers comprise procedure information, argument data for the procedure if any, and a corresponding transaction identifier. The annotated redo log further comprises a plurality of redo records, each redo record comprising a copy of a change to a data block in the primary database and a corresponding transaction identifier, and an exit marker written into the annotated redo log when the procedure is done executing, the exit marker comprising an exit status for the procedure.

In another aspect, a method according to the invention replicates a procedure at a standby database. An annotated redo log is received from a primary database. The annotated redo log comprises one or more entry markers comprising: procedure information, argument data for the procedure if any, and a corresponding transaction identifier (XID), one or more redo records, each comprising a copy of a change to the primary database and a corresponding XID, and an exit marker comprising an exit status for the procedure. Upon seeing the entry markers, a logical transaction is created for the procedure, a logical transaction identifier (LXID) is set for the logical transaction, and session audit information is updated to indicate that a session is executing the procedure. An entry logical change record (LCR) corresponding to the entry markers is created. The entry LCR comprises the LXID, the procedure information, and a pointer to the argument data for the procedure if any. LCR's for the redo records in the session that is executing the procedure are created. Each LCR for the redo records comprises the LXID, the XID of the corresponding redo record, and an operation describing the corresponding change to the primary database. An exit LCR corresponding to the exit marker is created, the exit LCR comprising the LXID and the exit status: the exit status is the actual error number returned at the end of execution, zero being success (i.e. no error). The LCR's for the redo records are grouped into child transactions according to their corresponding XID's, and the child transactions are grouped into the logical transaction. If the exit status indicates a successful execution of the procedure at the primary database, then the child transactions are discarded, and the logical transaction is applied to the standby database, where the procedure of the logical transaction is called at the standby database with the argument data if any.

In another aspect, a system according to the invention comprises a standby database comprising a system table for storing data blocks; and code for processing an annotated redo log from a primary database. The annotated redo log comprises one or more entry markers comprising: procedure information, argument data for the procedure if any, and a corresponding transaction identifier (XID), one or more redo records, each comprising a copy of a change to the primary database and a corresponding XID, and an exit marker comprising an exit status for the procedure. When the code executes, the code creates a logical transaction for the procedure upon seeing the entry markers, sets a logical transaction identifier (LXID) for the logical transaction, and updates session audit information to indicate that a session is executing the procedure. The code creates an entry logical change record (LCR) corresponding to the entry markers, the entry LCR comprising the LXID, the procedure information, and a pointer to the argument data for the procedure if any. The code further creates LCR's for the redo records in the session that is executing the procedure, wherein each LCR for the redo records comprises the LXID, the XID of the corresponding redo record, and an operation describing the corresponding change to the primary database, and creates an exit LCR corresponding to the exit marker, the exit LCR comprising the LXID and the exit status. The code groups the LCR's for the redo records into child transactions according to the corresponding XID's, and groups the child transactions into the logical transaction. If the exit status indicates a successful execution of the procedure at the primary database, then the code discards the child transactions and applies the logical transaction to the standby database, wherein the procedure of the logical transaction is called at the standby database with the argument data if any.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIGS. 5*a*-5*c* illustrate exemplary embodiments of the entry and exit marker structures.

FIG. 8*a* illustrates an exemplary embodiment of the LCR data structure.

FIG. 8*b* illustrates an exemplary embodiment of the argument data pointed to by an entry LCR.

Figure 1:
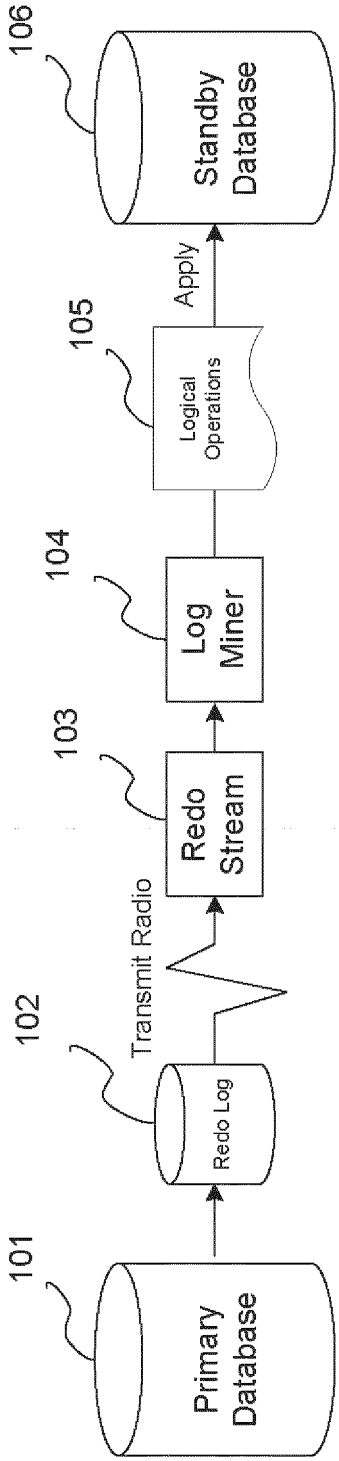
FIG. 1 illustrates a system that uses the redo log for replication.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The invention provides a method and system for replicating procedures at standby database systems using the redo log. The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the invention is not intended to be limited to the embodiment shown but is to be accorded the widest scope consistent with the principles and features described herein.

The following Detailed Description will begin with an overview of database management systems (DBMS) in which the invention is implemented and will then describe in detail how procedures are replicated at the standby database using the redo log.

Overview of DBMS in which the Invention is Implemented

Figure 2A:
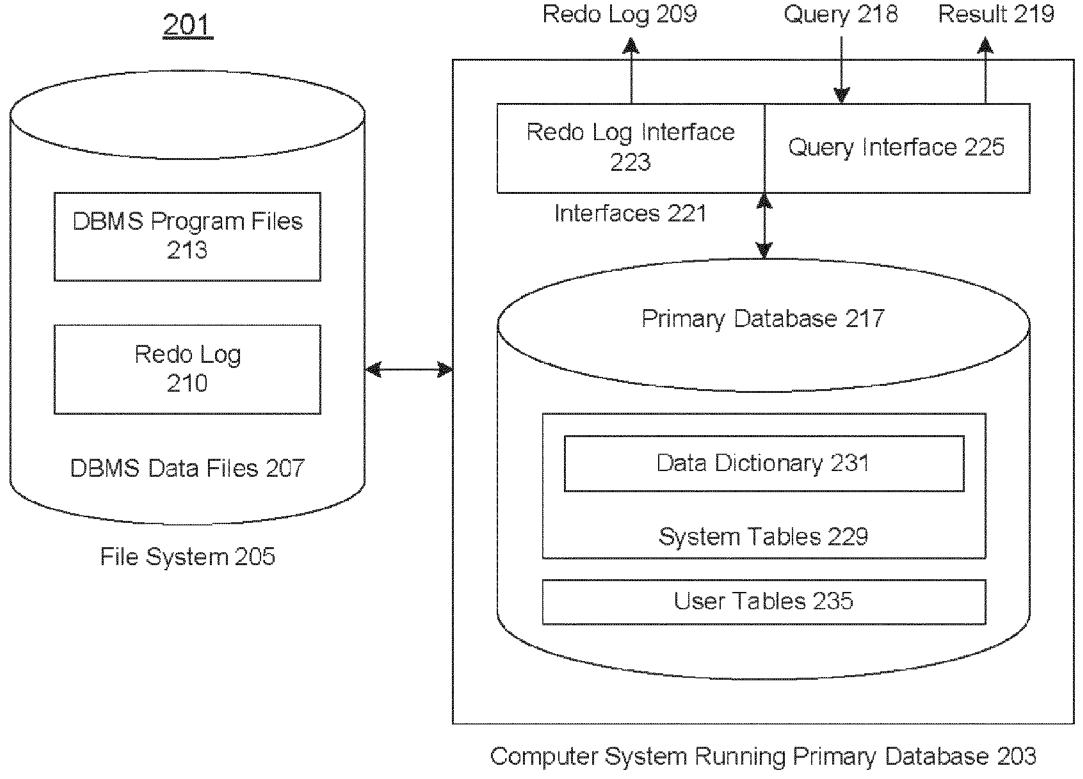
FIGS. 2*a*-2*b* illustrate DBMS in which the inventions are implemented.
Figure 2B:
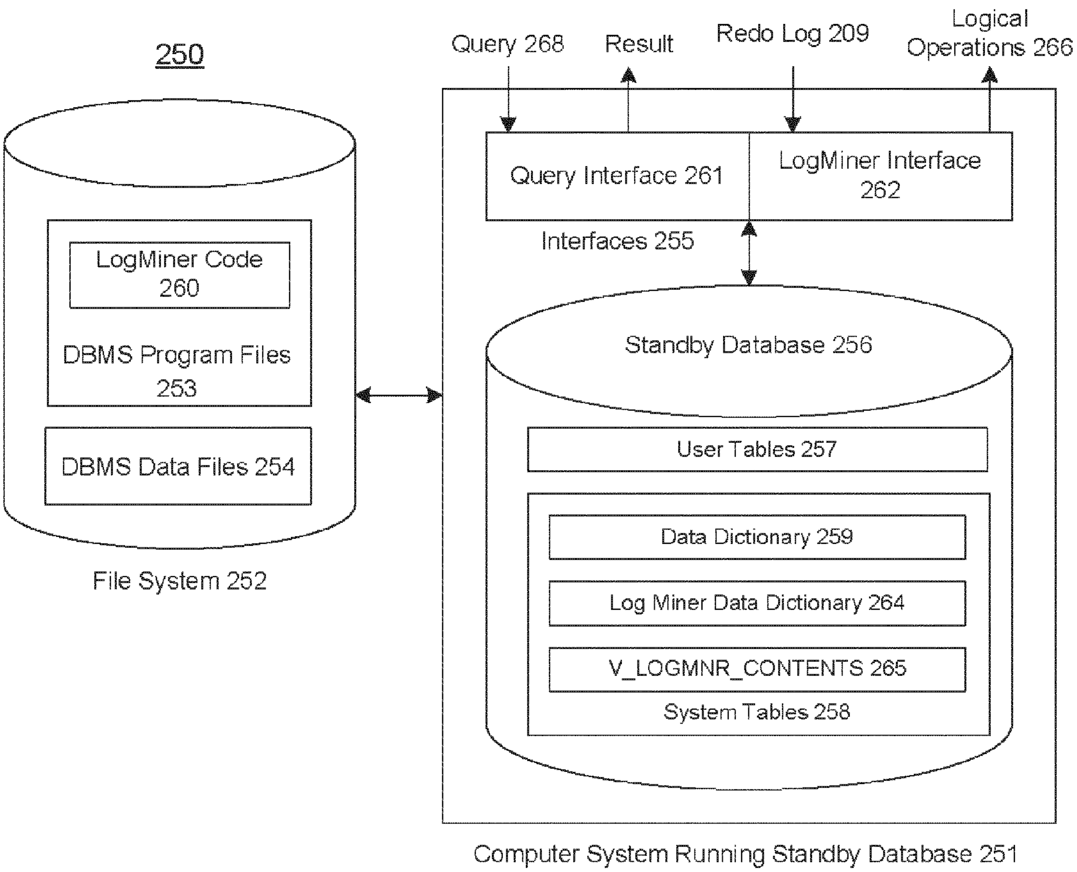

FIGS. 2*a* and 2*b* illustrate DBMS in which the inventions are implemented. FIG. 2*a* illustrates a primary DBMS whose components are relevant to the present discussion. The primary DBMS 201 has two main components: a computer system 203 which is running the primary database 217 and a file system 205 that is accessible to computer system 203. File system 205 includes DBMS program files 213 for the programs that create the primary DBMS 201 when they are executed in computer 203 and the data files 207 that contain the data for the primary DBMS 201. The data includes not only the data that the user accesses by means of the DBMS's tables, but also the data that defines those tables. To the program that interacts with the primary DBMS 201, the DBMS 201 appears as shown within computer system 203. DBMS 201 includes interfaces 221 by means of which other programs interact with DBMS 201 and primary database 217. Data stored in primary database 217 in data blocks is organized into tables including user tables 235 and system tables 229. Included in the latter is data dictionary 231, which is a collection of tables that defines the other tables in the DBMS 201, including the user tables 235.

As regards queries 218, DBMS 201 operates in the same fashion as any standard relational database system. The queries return results 219. In typical relational database systems, the queries are written using the standard structured query language (SQL). SQL contains two sublanguages: DML, which specifies operations on data in the DBMS tables, and DDL, which specifies operations on the definitions of the DBMS tables. Redo log interface 223 produces redo log 209 by making a copy of every data block that is changed in the primary database 217 and writing the copy of the block to a record in the redo logs 210. The records are written in the order in which the changes are made. This means that copies of data blocks changed by different transactions are interleaved in the redo log 209, and copies of data blocks are written to redo log 209 before the transaction that changed them is committed.

FIG. 2*b* illustrates a standby DBMS whose components are relevant to the present discussion. Similar to the DBMS 201, DBMS 250 also has two main components: a computer system 251 which is running the standby database 256 and a file system 252 that is accessible to computer system 251. File system 252 includes DBMS program files 253 for the programs that create the standby DBMS 250 when they are executed in computer 251 and the data files 254 that contain the data for the standby DBMS 250. DBMS 250 includes interfaces by means of which other programs interact with DBMS 250 and the standby database 256. The data stored in the standby database 256 are also organized into user tables 257 and system tables 258. The system tables 258 include the data dictionary 259.

DBMS 250 includes the LogMiner utility for making logical operations 266 from one or more redo logs 209 and making the logical operations 266 available for replication. If a user desires, the logical operations 266 may be stored in the file system 252. File system 252 also includes LogMiner code 260. Interfaces 255 include query interface 261 for queries 268, and LogMiner interface 262 for the LogMiner utility. Included in system tables 258 are LogMiner tables. Among these tables are LogMiner data dictionary 264, which is a special dictionary used by the LogMiner utility to produce logical operations 266, and V_LOGMNR_CONTENTS view 265, which is a table which is made from logical operations 266.

The LogMiner interface 262 receives an identification of a redo log 209 and produces logical operations 266 corresponding to the redo log 209. When the logical operations 266 are produced, LogMiner 260 makes table 265 from the logical operations 266 in LogMiner tables for the user.

Locations in redo logs 209 are identified by system change numbers, or SCN's. For each record in the redo log 209, a copy of the changed data block is stored, as well as a SCN and a transaction identifier (XID). The SCN identifies a change in the database system and associates the record with that change. A number of blocks may thus have the same SCN. The SCN's are monotonically increasing, and can thus be used to specify locations in a redo log 209. The XID identifies the transaction that made the change recorded in the redo record. When a transaction is committed, that fact is indicated by a commit record in the redo log 209. Records in the redo log 209 are ordered by increasing SCN, but records from different transactions may be interleaved.

LogMiner program 260 produces logical operations 266 from redo log 209 using information from LogMiner data dictionary 264. The information for the logical transactions is not interleaved; instead, the information for each logical transaction is grouped, and the order of the groups correspond to the order by SCN of the commit redo log records for the transactions in redo log 209.

In addition to reordering the information from redo log 209 as just described, LogMiner program 260 adds information obtained from LogMiner data dictionary 264 so that the DML operation and the table(s) and column(s) it is performed on can be read directly from logical operations 266. The logical operations 266 are made up of a sequence of logical change records (LCR's) 311. Each logical change record specifies one of at least the following:

a DML operation a DDL operation a transaction start a commit checkpointed state for a transaction The sequence of logical change records for a given transaction includes a transaction start LCR for the transaction, one or more LCR's specifying DML operations performed in the transaction, and a commit LCR for the transaction. With the DML operations, each LCR points to a list of PCR records that specify the columns affected by the operation; each PCR record points to the value produced in the column by the operation.

Figure 3:
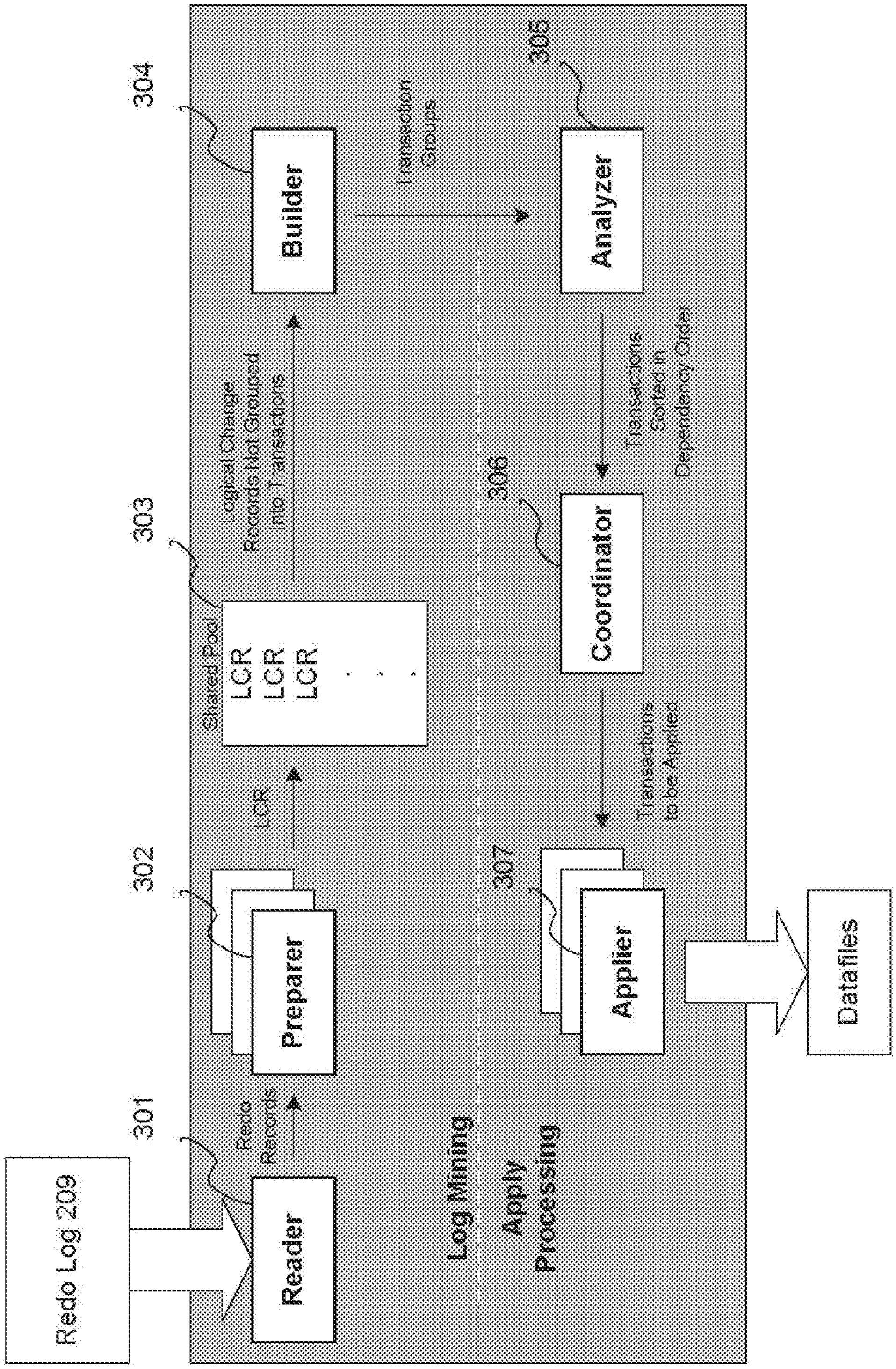
FIG. 3 illustrates in more detail the functions of the LogMiner utility at the standby database.

FIG. 3 illustrates in more detail the functions of the LogMiner utility at the standby database. The LogMiner 260 produces logical operations 266 from redo log 209 as specified by the user of the LogMiner 266. The LogMiner 260 includes three components: a Reader 301, a Preparer 302, and a Builder 304. The Reader 301 reads the redo log 209 and orders the redo records by increasing SCN. The Preparer 302 makes LCR's, PCR's (Physical Change Records), and VALs (Data Values) that provide logical descriptions of the operations described by the redo records. The LCR's are staged in a shared pool 303. The Builder 304 groups the LCR's into transactions and also merge incomplete LCR's into a single LCR. The LCR's, PCR's, and VAL's are made using the information from the redo records and information from LogMiner data dictionary 264. The Builder 304 orders the transactions in logical operations 266 by the SCN of the commit record in the redo log 209 for the transaction. The transactions are then sent to Apply Processing, which includes three components: an Analyzer 305, a Coordinator 306, and an Applier 307. The Analyzer 305 examines the transaction chunks containing a group of LCR's and sorts the transactions in dependency order. The Coordinator 306 assigns the transactions, monitors dependencies between transactions and coordinates scheduling, and authorizes the commitment of changes to the logical standby database 250. The Applier 307 applies the LCR's to the standby database 250, asks the Coordinator 306 to approve transactions with unresolved dependencies, and commits the transactions.

Annotation of Redo Log for Procedures Support

The method and system according to the invention annotates the redo log 209 to provide information concerning the execution of a procedure at the primary database 201, without perturbing the original transactional states to support replication of the procedure that executes one or more transactions at a standby database. The annotations include entry and exit markers in the redo log 209 that indicate the beginning and the end of the execution of a procedure at the primary database 201 along with any arguments passed to the procedure, and whether or not the execution of the procedure was successful. At the standby database 250, these markers are used to create a logical transaction associated with the procedure. The operations performed by the procedure are grouped into individual transactions, and these individual transactions are grouped as belonging to the logical transaction. If the execution of the procedure was successful at the primary database 201, then the individual transactions are discarded, and the logical transaction is passed to apply processing. Apply processing calls the procedure associated with the logical transaction and passes the same arguments, and the procedure is executed at the standby database 250, thus replicating the changes made at the primary database 201. If the execution of the procedure failed at the primary database 201, then both the individual transactions and the logical transaction are discarded.

The invention differs from conventional remote procedure calls in that remote procedure calls are not based on the redo log, but are based on wired protocols. Further, remote procedure calls do not survive crashes or failures. If a database crashes during the execution of a remote procedure call, there is no permanent record concerning the call. With the invention, because the execution of the procedure is written into the redo log, there is a permanent, durable record in case of a database crash. Recovery or replication of the procedure can then be accomplished, as described below. Also, unlike RPC, log based replication of procedures allows asynchronous execution while preserving the original order of execution.

Figure 4:
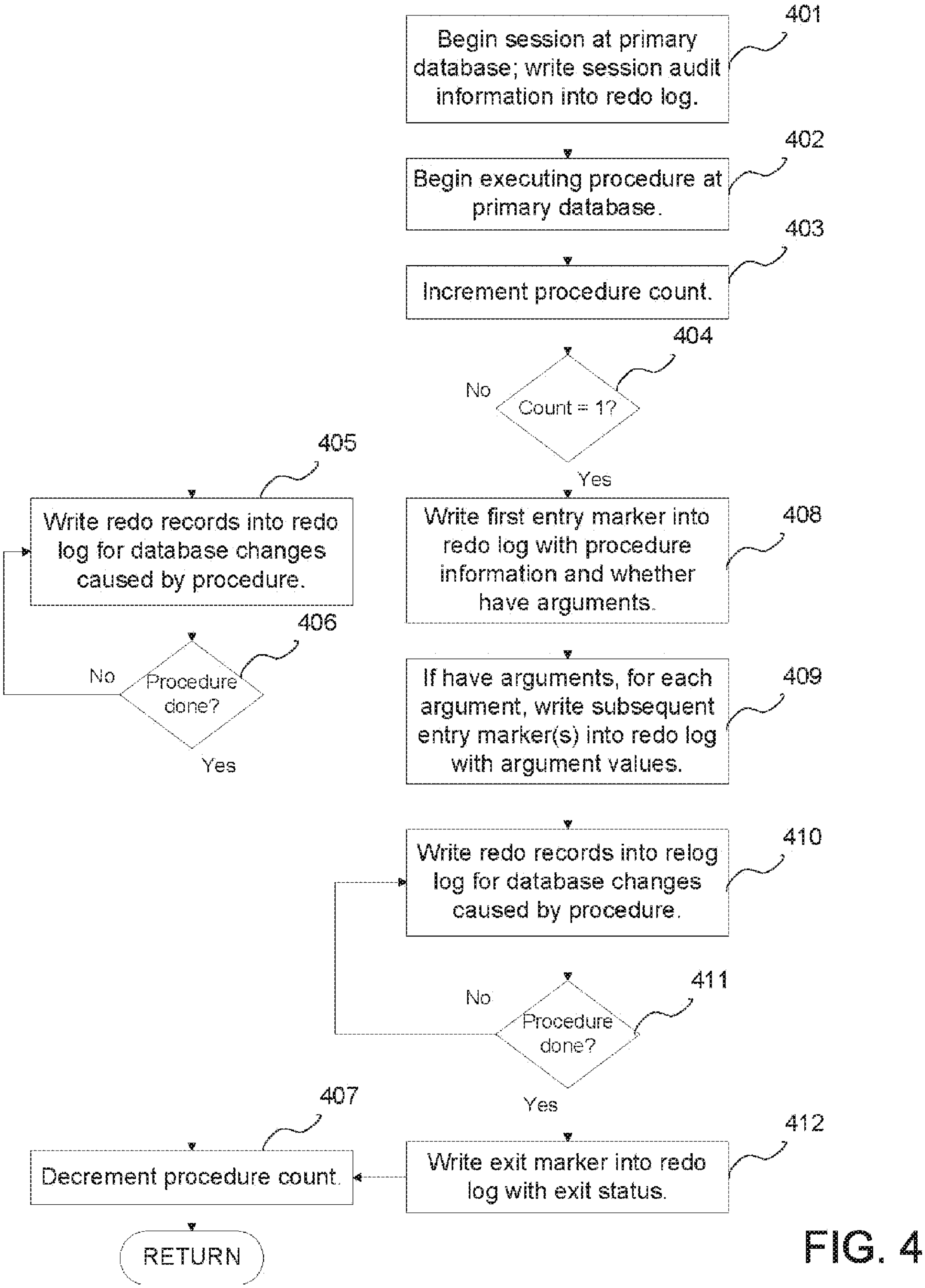
FIG. 4 is a flowchart illustrating the creation of entry and exit markers into the redo log at the primary database.

FIG. 4 is a flowchart illustrating the creation of entry and exit markers into the redo log at the primary database. When a session begins at the primary database 201, session audit information is written into the redo log 209 (step 401). When a procedure begins executing at the primary database 201 (step 402), a procedure's count, stored as part of the database session information, is incremented (step 403). The session's procedure count tracks the depth level for nested procedure calls. For replication, markers are created only for the top-level procedure call. At the beginning of the session, the procedure count is initially set=0. If after incrementing the procedure count the count is not equal to 1 (step 404), then this is a nested procedure call. No redo markers are written into the redo log 209. Redo records are written into the redo log 209 for database changes caused by the procedure (step 405). Once the procedure is done executing (step 406), the procedure count is decremented (step 407).

If the procedure count is equal to 1 (step 404), then this is a top level procedure call. A first entry marker redo record is written into the redo log 209 (step 408), which includes information about the procedure and whether the procedure has arguments, and the session from which it was executed. If the procedure has arguments, for each argument, subsequent entry marker is written into the redo log 209 that contain the argument value (step 409). Redo records are then written into the redo log 209 for each change to a data block caused by the procedure (step 410). When the execution of the procedure is done (step 411), an exit marker is written into the redo log 209, which includes the exit status of the procedure (step 412), and the procedure count is decremented (step 407). Possible exit status values include zero, meaning no error occurred, and a number indicating that an error occurred and what that error was. Thus, changes that occur in the session between the entry and exit markers belong to the procedure.

FIGS. 5*a*-5*c* illustrate exemplary embodiments of the entry and exit marker structures. FIG. 5*a* illustrates the common fields for entry and exit markers. These fields exist in first entry markers, subsequent entry markers, and exit markers, and include:

(1) ChgVecType: the change vector type of the record. Possible types include 'first entry marker', 'exit marker', and 'subsequent entry marker'.

(2) MergeFlag: contains two flags, KDOGLMNS and KDOGLMNE. If the record is an exit marker, or an entry marker with no arguments, then both flags are set to indicate that the change vector is contained in only one redo record. If the record is a first entry marker with arguments, then the change vector is chained across multiple redo records. The first redo record in the chain will have only the KDOGLMNS flag set, and the last redo record in the chain will have only the KDOGLMNE flag set.

(3) firstSegcol: If argument data is associated with multiple columns, the value of this field is the first column's number. This is used by the LogMiner 260 in creating LCRs, and has a non-zero value only if the change vector type is 'subsequent entry marker redo'.

(4) opcode: operation code, used by the LogMiner 260 in creating LCR's to set the operation field in the LCR. Possible values are 'enter' and 'exit'.

(5) XID: transaction identifier in which the marker is dropped.

FIG. 5*b* illustrates the other fields in the first entry marker and exit marker, but not subsequent entry marker. These fields include:

(6) stealthXID: stealth transaction identifier. This is a special empty transaction started if the procedure is called with a current action transaction. This field only gets used if the procedure does commit as its first bit of work. Stealth transactions are described in more detail later in this specification.

(7) exitStatus: exit status of the procedure. This value is non-zero only for the exit marker. If the procedure fails, then the error code is the value of this field.

(8) pragmaop: pragma option specified in the procedure. Possible values include 1=supported, 2=manual, and 3=auto. These pragma options are described in more detail later in this specification.

(9) flags: information about pragma-d procedure. Possible values include 1=autonomous procedure (procedure executes independent from definer's privileges or rights) and 2=definer's rights (procedure executes with the definer's privileges or rights).

(10) ownernm: owner name for the procedure.

(11) pkgnm: procedure package name.

(12) procnm: procedure name.

(13) logged in username: user name of logged in user.

(14) default/current schema: name of the default or current schema.

FIG. 5*c* illustrates the other fields in the subsequent entry marker. If the first entry marker indicates that there are arguments, then the subsequent entry marker includes the actual argument data. The other fields in the subsequent entry marker include:

(6) name: argument name.

(7) mode: argument mode. Possible values include: 1=IN (input value only); 2=OUT (output value only); 3=RETURN (return value); and 4=INOUT (input and output values).

(8) maxsize: maximum size of an OUT parameter.

(9) dtytype: external data type.

(10) objtype: (reserved for future use).

(11) csetform: character set form.

(12) csetid: character set ID.

(13) data: actual argument data.

The above set of fields is repeated for each argument.

The redo log 209, annotated with the entry and exit markers as described above, is then sent to the standby database 250 for the purpose of replication. The LogMiner 260 at the standby database 250 processes the entry and exit markers as set forth below.

Processing of Annotated Redo Log at Standby Database

Figure 6:
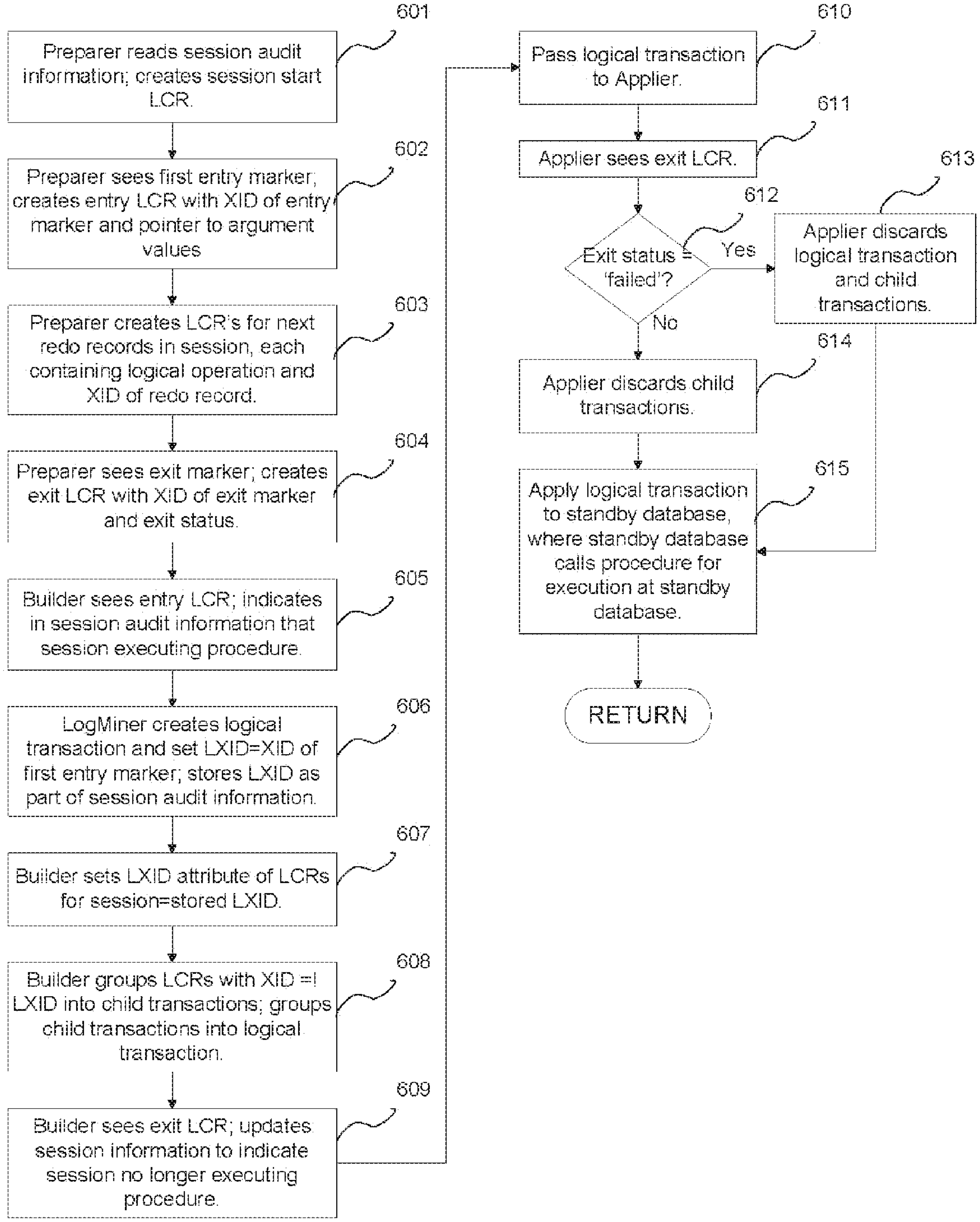
FIG. 6 illustrates the processing of entry and exit markers by the LogMiner at the standby database.

FIG. 6 illustrates the processing of entry and exit markers by the LogMiner at the standby database. The Reader 301 reads the redo records from the redo log 209 and orders the redo records by increasing SCN. Whenever the Preparer 302 reads the session audit information in the redo log 209, it creates an LCR indicating a session has begun (step 601). When the Preparer 302 sees the first entry marker, it creates an entry LCR (step 602), which contains the XID of the corresponding first entry marker, and if the procedure has arguments, a pointer to the argument values obtained from the subsequent entry markers. The Preparer 302 then creates an LCR for each of the next redo records in the same session until an exit marker is seen (step 603). Each of these LCR's contains the operation for the redo record and the XID of the corresponding redo record. When the Preparer 302 sees the exit marker redo record, it creates an exit LCR, which contains the XID of the corresponding exit marker, and the exit status of the procedure (step 604).

When the Builder 304 receives the session start LCR, the information is stored in Log Miner's memory. When the Builder 304 receives an entry LCR, it looks up and stores in the session audit information an indication that this session is executing a procedure (step 605). LogMiner 260 creates a logical transaction to represent the procedure and sets a logical transaction identifier (LXID) for the logical transaction equal to the XID of the first entry marker (step 606). This LXID is stored as part of the session audit information. All LCRs received by the Builder 304 for this session then have the LXID attribute of the LCR set to the LXID stored in the session information (step 607). If the procedure starts any new transactions, these LCRs will have an LXID that is not equal to the LCR's XID. The Builder 304 groups the LCRs with XID=! LXID into transactions, and groups these transactions into the logical transaction with that LXID (step 608). The transactions within the logical transaction are thus the 'child' transactions to the 'parent' logical transaction. To accomplish the grouping, as the Builder 304 encounters the entry LCR, it creates a list for the LXID. As the Builder 304 encounters each LCR where the XID=LXID, the Builder 304 groups these directly into the logical transaction. As the Builder 304 encounters each LCR where the XID=! LXID, the Builder 304 adds the LCR to a sublist of LCR's for the transaction identified by its XID. In the sublist, the LCR's are ordered by SCN. The Builder 304 keeps adding LCR's to the XID's list until it encounters the commit LCR for the XID. Each of these transactions are added to the LXID list until the exit LCR is encountered at which point LogMiner's session information is updated to indicate that this session is no longer executing the procedure (step 609). The logical transaction is then complete and it can be passed to the Applier 307 (step 610).

As the Applier 307 encounters the exit LCR (step 611), it determines if a non-zero error had been recorded in the exit status meaning its execution had failed (step 612). If so, it discards both the logical transaction and the child transactions (step 613). The operations in these LCR's are thus not applied to the standby database 250. It is possible that a procedure, which executes multiple transactions, may have failed on the primary database 201 after one or more transactions have been committed and fail in such a way that the procedure's exception handler was not able to undo the committed change. The Applier 307 inspects child transactions prior to discarding them to see if work had been committed. Then, if an exit failure LCR is received and the discarded child transactions had committed work, the Applier 307 can notify the database administrator that there has been a potential issue. If the Applier 307 sees that the exit status is zero, meaning the procedure had not failed (step 612), it discards the child transactions (step 614), and only applies the logical transaction. The Applier 307 applies the logical transaction to the standby database 250, where the standby database 250 calls the procedure for execution at the standby database 250 (step 615). Thus, instead of applying the operations of the individual transactions at the standby database 250, the procedure itself is executed at the standby database 250. If the procedure had arguments, these arguments are obtained through the entry LCR and are passed to the procedure when executed.

Figure 7:
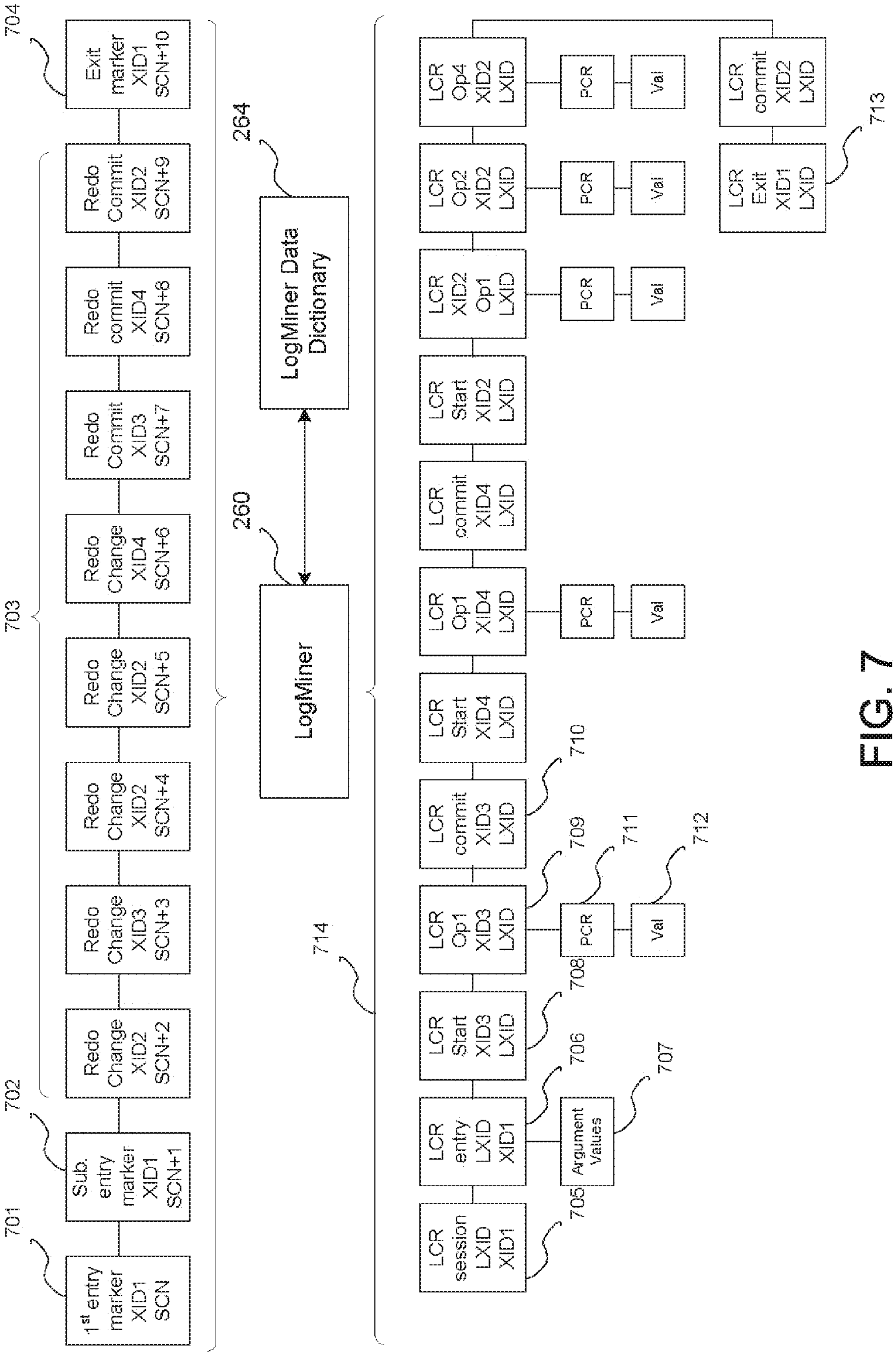
FIG. 7 illustrates an exemplary portion of a redo log and LCR's made form the portion of the redo log.

FIG. 7 illustrates an exemplary portion of a redo log and LCR's made from the portion of the redo log. Referring to both FIG. 4 and FIG. 7, a session begins at the primary database 201 and session audit information is written into the redo log 209 (step 401). When a procedure begins executing at the primary database 201 (step 402), a procedure's count is incremented (step 403). Assume that the count=1 (step 404). A first entry marker 701 is written into the redo log 209 (step 408), which contains procedure information and whether the procedure has arguments. The first entry marker 701 also contains its SCN and the transaction identifier, XID1, of the transaction in which the first entry marker 701 is created. Assume that the procedure has arguments, and one or more subsequent entry markers 702 are written into the redo log 209 as well (step 409) with the argument values and XID1 as the transaction identifier. For the changes to data blocks of the primary database 201 caused by the procedure, a plurality of redo records 703 are written into the redo log 209 (step 410). Each redo record 703 contains the change, its transaction identifier, and its SCN. The redo records 703 can span multiple transactions, such as XID2, XID3, and XID4. For each transaction, there is a redo record for each change and a commit redo record. When the procedure is done executing (step 411), an exit marker 704 is written into the redo log 209 (step 412). The exit marker 704 contains the exit status and the transaction identifier, XID1, and its SCN. The redo records 701-704 are sent to the standby database 250, where the LogMiner 260 makes the logical operations 266 from the redo log 209.

Referring now to both FIG. 6 and FIG. 7, the Preparer 302 reads the session audit information in the redo log 209 and creates a session start LCR 705 (step 601). When the LogMiner 260 sees the first entry marker 701, it creates an entry LCR 706 (step 602), which contains the XID1. Since the procedure has arguments, the argument values from the subsequent entry marker 702 are stored in a data structure, and entry LCR 706 contains a pointer to the argument values 707 in the data structure. LCR's are then created for each following redo record 703 (step 603). Each LCR contains the XID of the corresponding redo record. An LCR 709 can point to a list of PCR 711 that specify the columns affected by its operation. Each PCR 711 points to the value 712 produced in the column by the operation. When the LogMiner 260 sees the exit marker 704, it creates an exit LCR 713 (step 604). The exit LCR 713 contains the exit status and XID1.

When the Builder 304 receives the session start LCR 705, the information is stored in LogMiner's memory. When the Builder 304 receives the entry LCR 706, it looks up and stores in the session audit information an indication that this session is executing a procedure (step 605). LogMiner 260 creates a logical transaction to represent the procedure and sets a LXID for the logical transaction equal to XID1 (step 606). This LXID is stored as part of the session audit information. The LCR's 714 received by the Builder 304 for this session then have the LXID attribute of the LCR set to LXID (step 607). The new transactions started by the procedure (XID2, XID3, and XID4) will have an LXID not equal to their respective XID's. The Builder 304 groups the LCR's with the same LXID into a logical transaction. Within the logical transaction, the Builder 304 groups the LCR's with the same XID into a transaction. So the LCR's 708-710 with XID3 are grouped, LCR's with XID4 are grouped, and LCR's with XID2 are grouped. Since the transaction identifiers for these transactions are not equal to the LXID, they are grouped as child transactions to the logical transaction (step 608). When the Builder 304 sees the exit LCR 713, the logical transaction is complete. LogMiner's session information is updated to indicate that this session is no longer executing the procedure (step 609). The logical transaction is then passed to apply processing (step 610). When the Applier 307 sees the exit LCR 713 (step 611), it examines the exit status in the exit LCR 713. If it indicates a failure (step 612), then both the logical transaction and the child transactions, XID2, XID3, XID4, are discarded (step 613), so that their operations are not applied to the standby database 250. Otherwise, the child transactions, XID2, XID3, and XID4, are discarded (step 614), and only the logical transaction described in the entry LCR 706 is applied (step 615). The standby database 250 then calls the procedure described in the entry LCR 706, passes the arguments 707 to the procedure, and executes the procedure at the standby database 250.

Since the changes caused by the procedure are grouped into a logical transaction, these changes are applied or discarded as a whole. Since the procedure is called at the standby database 250 instead of applying the individual operations 266, the procedures runs on local metadata, allowing for results that are the same as those realized at the primary database 201.

FIG. 8*a* illustrates an exemplary embodiment of the LCR data structure. The fields include:

(1) Operation: the user-level operation associated with the LCR (like INSERT, UPDATE, DELETE, DDL, etc.). If the LCR is for a procedure, then the operation is either 'entry' or 'exit'.

(2) Num_per: indicates the number of PCRs associated with this LCR.

(3) XID: transaction identifier associated with this LCR. This is the same for all LCRs associated with the same transaction.

(4) LXID: logical transaction identifier associated with the procedure causing the operation.

(5) Object_number: each LCR is associated with the change made to the primary database object (this refers to the internal number that is associated with the database table).

(6) Object_version: the version determines the primary database object definition (like how many columns the base table contains, etc.).

(7) Low_scn: An LCR can be made of different redo records, if incomplete LCR's are merged into one LCR. The low_scn is the SCN of the earliest redo record associated with the LCR.

(8) High_scn: An LCR can be made of different redo records. The high_scn is the SCN of the latest "redo record" associated with the LCR.

(9) Property: Other information about the LCR.

(10) PCR_ptr: Pointer to this LCR's PCRs. If this is an LCR for a procedure, then this points to the argument data.

FIG. 8*b* illustrates an exemplary embodiment of the argument data pointed to by an entry LCR. The fields include:

(1) own: owner information for the procedure.

(2) pkg: procedure package information.

(3) proc: procedure name.

(4) logusr: user name of logged in user.

(5) defusr: default user.

(6) name: argument name.

The next set of fields 801 contains the argument data. These fields 801 are repeated for each argument.

DML and DDL LCR's

When the Builder 304 encounters a DML or DDL in an LCR, additional processing is needed to ensure proper execution by apply processing. DML and DDL are SQL sublanguages. DML specifies operations on data in the DBMS tables, and DDL specifies operations on the definitions of the DBMS tables.

The database administrator can create "skip rules" to ignore certain procedures during replication based on the procedure's pragma option, procedure name, and argument data values. For DML's, the database administrator can create skip rules to ignore certain classes of user data during replication. DMLs to system tables are always ignored and ineligible for skip rules. User data classes set to be skipped are thus unsupported for replication. If DML's are executed during the execution of a procedure, and the data affected by any of the DML's are to be ignored according to the skip rules, then the whole procedure is unsupported since all transactions caused by the procedure are to be applied or not applied as a group. To do this, the Builder 304 intercepts any DML LCR's, suppresses the execution of the DML, flips the DML to a procedure_DML, and checks whether any of the procedure_DML's acted on an unsupported user-data table (i.e., set to be skipped). If all of the procedure_DML's acted on supported user data tables or system tables, then the procedure is executed by apply processing. If any of the procedure_DML's acted on a non-supported user-data table, then the procedure is not executed by apply processing.

For DDL's, the metadata of the tables at the standby database 250 are typically re-evaluated after the commit of each transaction. The metadata cannot be queried reliably until the transaction commits. However, when the DDL is part of a procedure, re-evaluation cannot be performed until after the procedure commits. To support this, the Builder 304 intercepts any DDL LCR's, suppresses the execution of the DDL, flips the DDL to a procedure_DDL, and pushes the procedure_DDL onto a stack. After the procedure is executed at the standby database, the procedure_DDL's on the stack are fetched on a FIFO basis. The metadata for the affected tables are then re-evaluated.

Stealth Transactions

If a user begins executing a procedure at the primary database 201 while there is an ongoing transaction, then there has not yet been a commit for the current transaction. In this case, database program 213 will begin and commit an empty recursive transaction. This empty transaction causes a start transaction and a commit transaction redo record containing a new XID to be written to the redo log. This transaction is also tagged as being a LogMiner stealth transaction. To avoid mistakes in replication at the standby database 250, if the procedure is written such that it first commits the ongoing transaction, the commit is to be pushed out of the procedure to be applied by itself. To accomplish this and still support replication of the procedure, a special empty transaction, called a stealth transaction, is created at the primary database 201 with a stealth transaction identifier (stealthXID). This stealthXID may then be used at the standby database 250 as the LXID of the logical transaction representing the procedure, as described further below.

Figure 9:
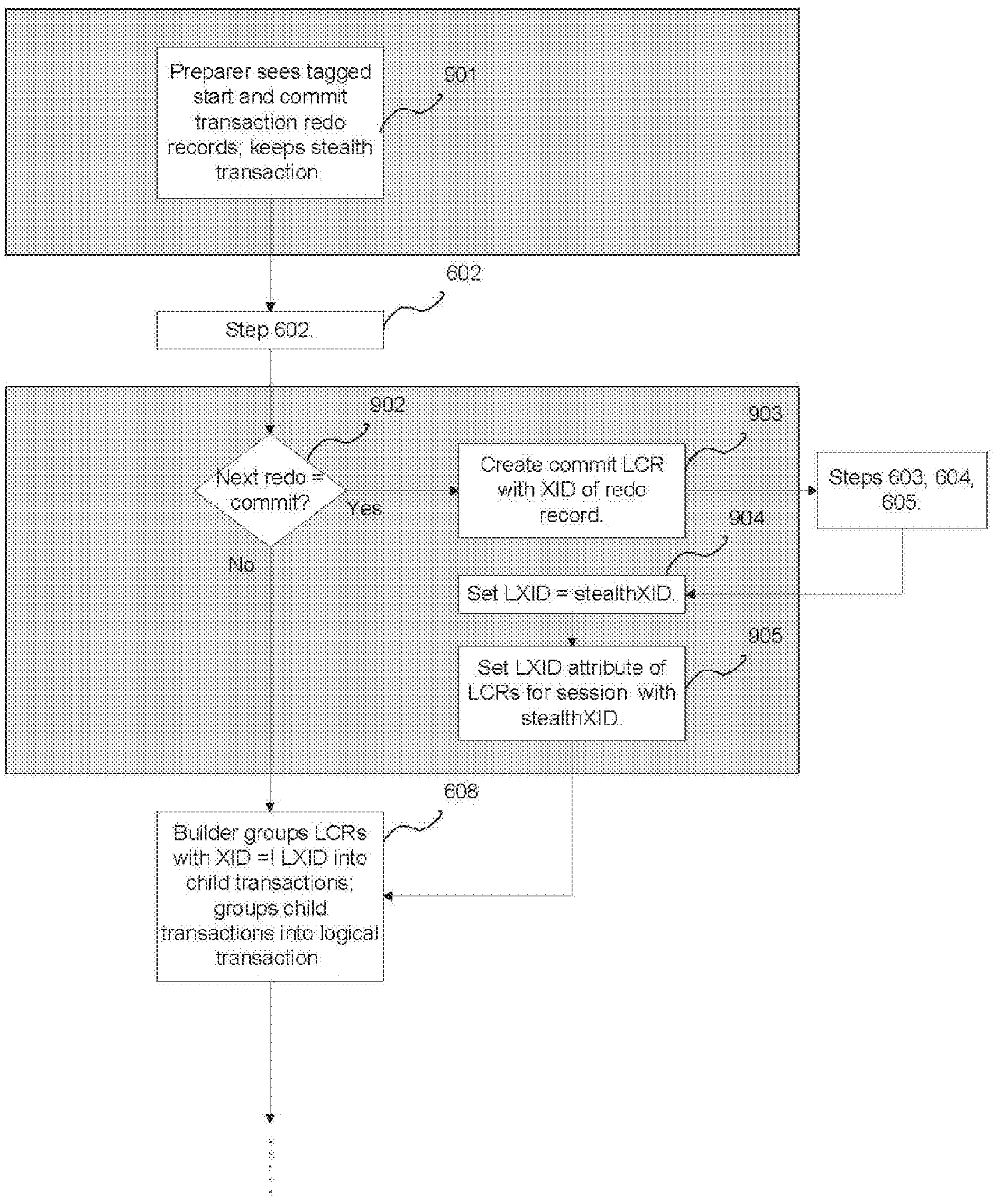
FIG. 9 is a flowchart illustrating the processing of the stealth transaction at the standby database.

FIG. 9 is a flowchart illustrating the processing of the stealth transaction at the standby database. The LogMiner 260 sees the tagged start and commit transaction redo records and keeps the stealth transaction (step 901). The Preparer 302 sees the first entry marker and processes it per step 602 (FIG. 6). If the next redo record from the original transaction is a commit (step 902), then the LogMiner 260 creates a commit LCR with the XID of this redo record (step 903). This pushes the commit outside of the procedure to be applied by itself. The remaining redo records are then processed per steps 603-604 (FIG. 6). When the Builder 304 sees the entry LCR (step 605), it sets the LXID of the logical transaction to the stealthXID (step 904). An entry LCR is then created with LXID=stealthXID (step 905). LCR's are then created for the next redo records, and each LCR will contain stealthXID as the LXID (step 608). The replication of the procedure then proceeds as set forth in FIG. 6 above.

Categories for Pragmas

The invention as described above applies to procedures that can be automatically replicated at the standby database 250 using their original call signature. However, this is not necessarily true for all procedures in the DBMS. In order to differentiate between procedures that can be replicated at the standby database 250 using their original call signatures from those that cannot, or cannot without further intervention, the procedures are divided into categories. In the exemplary embodiment, there are four categories of procedures:

(1) Unsupported: the procedure cannot be automatically replicated using the redo log. Manual replication by a database administrator would be required.

(2) Auto: the procedure can be automatically replicated using the redo log using the procedure's original call signature.

(3) Manual: the procedure cannot be automatically replicated using the redo log with the original procedure call, but can be automatically replicated with an alternative procedure call. A procedure falls in this category if the execution of the original procedure may not produce the same result at the standby database. To obtain the same result, an alternative procedure, with alternative arguments if any, is required. If no alternative procedure is specified the effect is to suppress execution of the procedure at the standby and hide the effects of the procedure at the primary from the standby. This may be used to suppress actions which have no relevance to the standby or which must not be replicated.

(4) None: the procedure is of no interest to the standby database (e.g. pragma is informational only) and need not be replicated.

To support the different categories, a pragma with the appropriate category option is attached to each procedure. A pragma is a directive to the compiler. Each of the first three pragma options (Unsupported, Auto, and Manual) will cause the compiler to generate code to call back into LogMiner on entry and exit from the given procedure. Pragma option None will be informational only and will not generate any new code. The pragma category is stored as an option in the pragmaop field of the first entry and exit markers (see FIG. 5*b*).

The addition of a pragma to a procedure will alter the handling of the apply processing of the redo generated by the procedure. If the specified pragma option is Unsupported, then apply processing will ignore all redo generated by the procedure and will issue a message to the database administrator that a procedure was called on the primary database 201 which cannot be automatically replicated. If the pragma option is Auto, then apply processing will ignore all redo generated by the procedure and instead will execute the procedure itself with the original argument data that were passed to it on the primary, as described above.

If the pragma option is Manual, then apply processing will ignore all redo generated by the procedure and will not execute the procedure itself. The pragma adds an operation in the procedure at the primary database 201, called a Log Immediate statement, that will cause alternative entry markers to be written into the physical redo log 209, in addition to the first entry marker described above. A first alternative entry marker contains the alternative procedure name set forth in the Log Immediate statement. If the alternative procedure has arguments, then these arguments are set forth in the Log Immediate statement, and one or more subsequent alternative entry markers would contain the argument data.

The structure of an alternative entry marker is the same as for a first entry marker, illustrated in FIGS. 5*a*-5*b*. The field values for the alternative entry marker are similar to the first entry marker except for the pragmaop, pkgnm, and procnm fields. Here, the pragmaop field is set to 2=manual, the pkgnm field has the name of an alternative procedure package, and the procnm field has the name of an alternative procedure. When apply processing at the standby database 250 sees that the pragmaop field is set to 'manual', instead of calling the original procedure in the first entry marker, it will call the alternative procedure in the first alternative entry marker instead, and pass to it the arguments set forth in any subsequent alternative entry markers.

Failure at the Primary Database During Execution of Procedure

When the execution of a top-level procedure at the primary database 201 fails before the procedure completes, the error code is recorded in the redo log. The exception handler in the primary database 201 examines the session to see if a procedure was currently being applied and that it was a top-level procedure, and if so, causes an exit marker to be written that contains the error number of the error that occurred. If the procedure fails in such a way that the error cannot be intercepted and the exit marker generated by the session, the dead session is noticed after some period of time by the process monitor (PMON) which cleans up the dead session and generates a session exit marker on behalf of the dead session. If the Builder sees a session exit marker for a session, which was executing a procedure, the LXID transaction is rolled back. Errors thrown by nested procedures are ignored since neither entry nor exit markers are generated for any procedures except the top-level pragma'ed procedure.

Failure at Standby Database During Execution of Procedure

When the execution of a procedure at the standby database 250 fails before the procedure completes, then recovery from this failure requires special handling. A procedure typically involves multiple transactions. To recover from a failure of the procedure, all transactions caused by the procedure, including those that have already been committed, must be undone and the procedure re-executed. However, if one of these committed transactions created data structures, these data structures would be persistent, causing errors when the procedure is re-executed.

Figure 10:
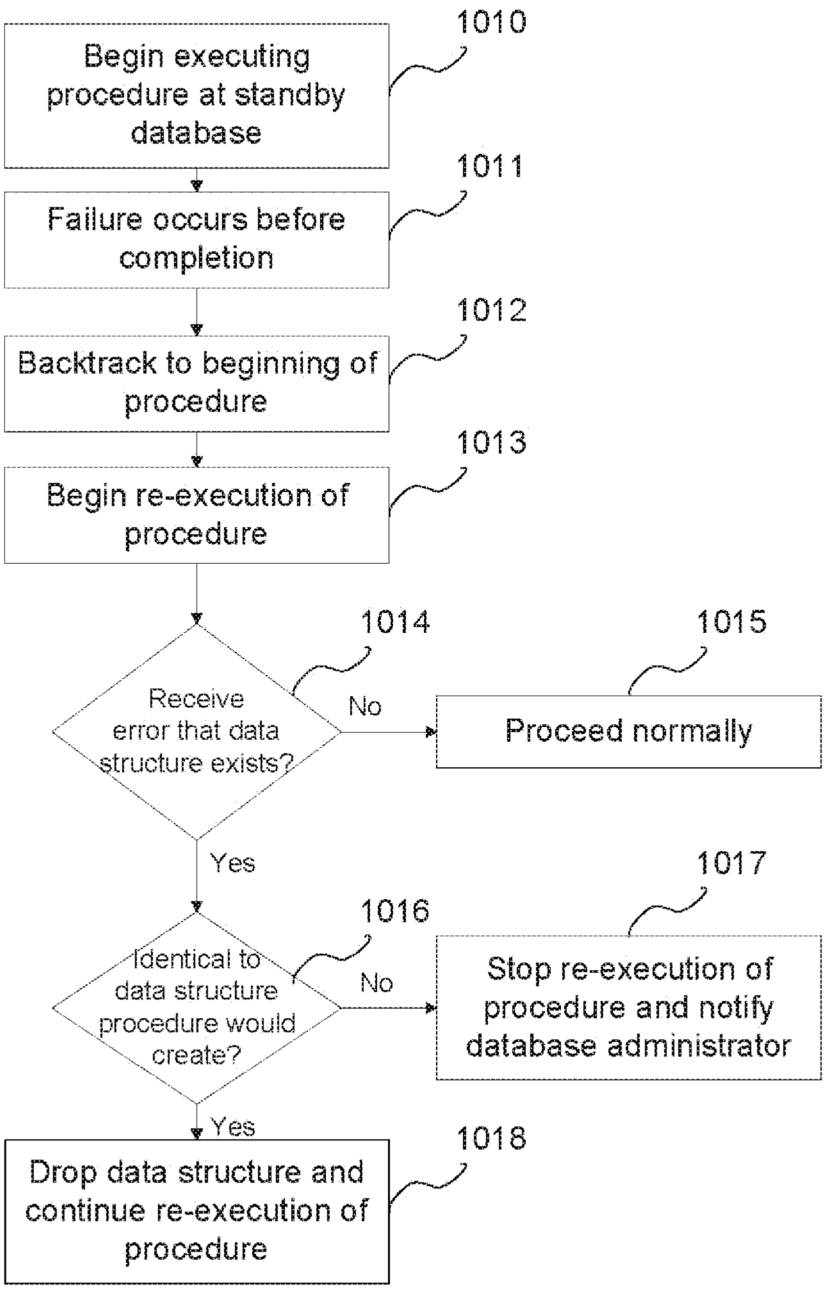
FIG. 10 is a flowchart illustrating the rollback of a failed procedure at the standby database.
Figure 4:
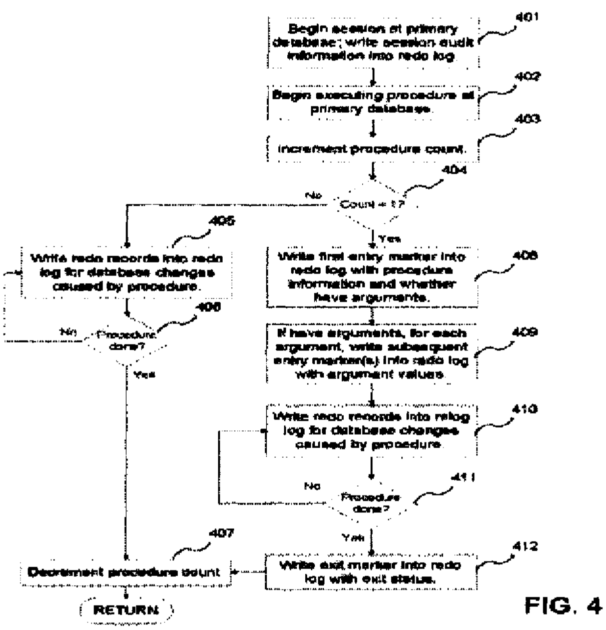

FIG. 10 is a flowchart illustrating the rollback of a failed procedure at the standby database. When a procedure begins executing at the standby database 250 (step 1010) and a failure occurs before the procedure completes (step 1011), then the standby database 250 backtracks to the beginning of the procedure (step 1012), and re-executes the procedure (step 1013). However, since this may include backtracking beyond committed transactions, data created by these previous committed transactions would be persistent at the standby database 250. For example, a transaction may create and populate a temporary table. In this case, during the re-execution of the procedure, the standby database 250 will receive an error indicating that the data structure that the procedure is trying to create already exists (step 1014). If no such error is received during the re-execution of the procedure, then the procedure proceeds normally (step 1015). When the error is received, the standby database 250 determines if the existing data structure is identical to the data structure that would be created by the procedure (step 1016). If so, then the data structure is dropped and the re-execution of the procedure continues (step 1018). If not, then the re-execution of the procedure is stopped and the database administrator is notified (step 1017). If the database administrator wishes to continue with the procedure, then the existing data structure would need to be cleared manually.

CONCLUSION

A method and system for supporting replication of procedures at a standby database are disclosed. The invention annotates a redo log to provide information concerning the execution of a procedure at the primary database. The annotations include entry and exit markers in the redo log that indicates the beginning and the end of the execution of a procedure at the primary database along with any arguments passed to the procedure, and whether or not the execution of the procedure was successful. At the standby database, these markers are used to create a logical transaction associated with the procedure. The operations performed by the procedure are grouped into individual transactions, and these individual transactions are grouped as belonging to the logical transaction. If the execution of the procedure was successful at the primary database, then the individual transactions are discarded, and the logical transaction is passed to apply processing. Apply processing calls the procedure associated with the logical transaction and passes the same arguments, and the procedure is executed at the standby database, thus replicating the changes made at the primary database. If the execution of the procedure failed at the primary database, then both the individual transactions and the logical transaction are discarded.

The Detailed Description is to be regarded as being in all respects exemplary and not restrictive, and the breadth of the invention disclosed herein is to be determined not from the Detailed Description, but rather from the claims as interpreted with the full breadth permitted by the patent laws.

We claim:

1. A method for replication of one or more procedures stored at a primary database to a standby database, wherein a procedure can correspond to multiple transactions executed as a unit, comprising for each procedure:

when the procedure executes at the primary database, writing one or more entry markers as entries into a redo log at the primary database, the one or more entry markers comprising: procedure information, argument data for the procedure if any, and a corresponding transaction identifier;

writing a plurality of redo records as entries into the redo log, at least one of the redo records comprising a copy of a change to the primary database and a corresponding transaction identifier; and when the procedure is done executing, writing an exit marker as an entry into the redo log, the exit marker comprising an exit status for the procedure indicating whether the procedure was successfully executed at the primary database, wherein the entry markers, the redo records, and the exit marker are sent to the standby database which is configured to group the transactions associated with the redo records into a procedure based at least in part upon the entry and exit markers such that the changes of the procedure are applied or discarded at the standby database as a whole.

2. The method of claim 1, wherein the entry markers comprise a first entry marker, the first entry marker comprising a procedure name and whether the procedure has arguments, wherein if the procedure has arguments, then the entry markers further comprise one or more subsequent entry markers, each subsequent entry marker comprising argument data for the procedure.

3. The method of claim 1, wherein if the procedure begins executing during a current transaction at the primary database, then the writing of the entry markers further comprises:

writing an empty recursive stealth transaction into the redo log, the stealth transaction comprising a flagged begin transaction and a flagged commit transaction redo record.

4. The method of claim 2, wherein the first entry marker further comprises a pragma option for indicating a category of the procedure, wherein the pragma option comprises an unsupported option for indicating that the procedure cannot be automatically replicated at a standby database using the redo log.

5. The method of claim 2, wherein the first entry marker further comprises a pragma option for indicating a category of the procedure, wherein the pragma option comprises a manual option for indicating that the procedure cannot be automatically replicated at the standby database using the redo log using an original call signature of the procedure, but can be replicated using an alternative procedure, wherein the writing of the entry markers further comprises: writing one or more alternative entry markers into the redo log, the alternative entry markers comprising: information for an alternative procedure, and alternative argument data if any.

6. The method of claim 1, wherein the redo log is annotated at the primary database without perturbing an original transactional state.

7. A computer system having a processor and memory, the system comprising:

the memory for storing a primary database, comprising a system table for storing data blocks; and the processor for executing a file system comprising code for running the primary database, wherein when executed, the code creates an annotated redo log to support replication of one or more procedures at a standby database, wherein a procedure can correspond to multiple transactions executed as a unit, the annotated redo log comprising for each procedure:

one or more entry markers written as entries into the annotated redo log when the procedure begins executing at the primary database, the one or more entry markers comprising: procedure information, argument data for the procedure if any, and a corresponding transaction identifier, a plurality of redo records, at least one of the redo records comprising a copy of a change to a data block in the primary database and a corresponding transaction identifier, and an exit marker written as an entry into the annotated redo log when the procedure is done executing, the exit marker comprising an exit status for the procedure indicating whether the procedure was successfully executed at the primary database, wherein the entry markers, the redo records, and the exit marker are sent to the standby database which is configured to group the transactions associated with the redo records into a procedure based at least in part upon the entry and exit markers such that the changes of the procedure are applied or discarded at the standby database as a whole.

8. The system of claim 7, wherein the entry markers comprise a first entry marker, the first entry marker comprising a procedure name and whether the procedure has arguments, wherein if the procedure has arguments, then the entry markers further comprise one or more subsequent entry markers, each subsequent entry marker comprising argument data for the procedure.

9. The system of claim 7, wherein if the procedure begins executing during a current transaction at the primary database, then the code writes an empty recursive stealth transaction into the redo log, the stealth transaction comprising a flagged begin transaction and a flagged commit transaction redo record.

10. The system of claim 8, wherein the first entry marker further comprises a pragma option for indicating a category of the procedure, wherein the pragma option comprises an unsupported option for indicating that the procedure cannot be automatically replicated at a standby database using the redo log.

11. The system of claim 8, wherein the first entry marker further comprises a pragma option for indicating a category of the procedure, wherein the pragma option comprises a manual option for indicating that the procedure cannot be automatically replicated at the standby database using the redo log using an original call signature of the procedure, but can be replicated using an alternative procedure, wherein the code writes one or more alternative entry markers into the redo log, the alternative entry markers comprising: information for an alternative procedure, and alternative argument data if any.

12. The computer system of claim 7, wherein the annotated redo log is created without perturbing an original transactional state.

13. A computer program product including a non-transitory computer-readable medium having instructions which, when executed by a processor, cause the processor to perform a process for replication of one or more procedures stored at a primary database to a standby database, wherein a procedure can correspond to multiple transactions executed as a unit, the process comprising for each procedure:

when the procedure executes at the primary database, writing one or more entry markers as entries into a redo log, the one or more entry markers comprising: procedure information, argument data for the procedure if any, and a corresponding transaction identifier;

writing a plurality of redo records as entries into the redo log, at least one of the redo records comprising a copy of a change to the primary database and a corresponding transaction identifier; and when the procedure is done executing, writing an exit marker as an entry into the redo log, the exit marker comprising an exit status for the procedure indicating whether the procedure was successfully executed at the primary database, wherein the entry markers, the redo records, and the exit marker are sent to the standby database which is configured to group the transactions associated with the redo records into a procedure based at least in part upon the entry and exit markers such that the changes of the procedure are applied or discarded at the standby database as a whole.

14. The computer program product of claim 13, wherein the entry markers comprise a first entry marker, the first entry marker comprising a procedure name and whether the procedure has arguments, wherein if the procedure has arguments, then the entry markers further comprise one or more subsequent entry markers, each subsequent entry marker comprising argument data for the procedure.

15. The computer program product of claim 13, wherein the redo log is annotated at the primary database without perturbing an original transactional state.

16. The computer program product of claim 13, wherein if the procedure begins executing during a current transaction at the primary database, then the writing of the entry markers further comprises:

writing an empty recursive stealth transaction into the redo log, the stealth transaction comprising a flagged begin transaction and a flagged commit transaction redo record.

17. The computer program product of claim 14, wherein the first entry marker further comprises a pragma option for indicating a category of the procedure, wherein the pragma option comprises an unsupported option for indicating that the procedure cannot be automatically replicated at a standby database using the redo log.

18. The computer program product of claim 14, wherein the first entry marker further comprises a pragma option for indicating a category of the procedure, wherein the pragma option comprises a manual option for indicating that the procedure cannot be automatically replicated at the standby database using the redo log using an original call signature of the procedure, but can be replicated using an alternative procedure, wherein the writing of the entry markers further comprises: writing one or more alternative entry markers into the redo log, the alternative entry markers comprising: information for an alternative procedure, and alternative argument data if any.

19. The computer program product of claim 13, in which the non-transitory computer-readable medium comprises memory.

* * * * *

UNITED STATES PATENT AND TRADEMARK OFFICE

CERTIFICATE OF CORRECTION

PATENT NO. : 8,676,752 B2
APPLICATION NO. : 13/292918
DATED : March 18, 2014
INVENTOR(S) : Kundu et al.

It is certified that error appears in the above-identified patent and that said Letters Patent is hereby corrected as shown below:

In the Drawings:

On sheet 5 of 13, lines 1-27, delete

“ 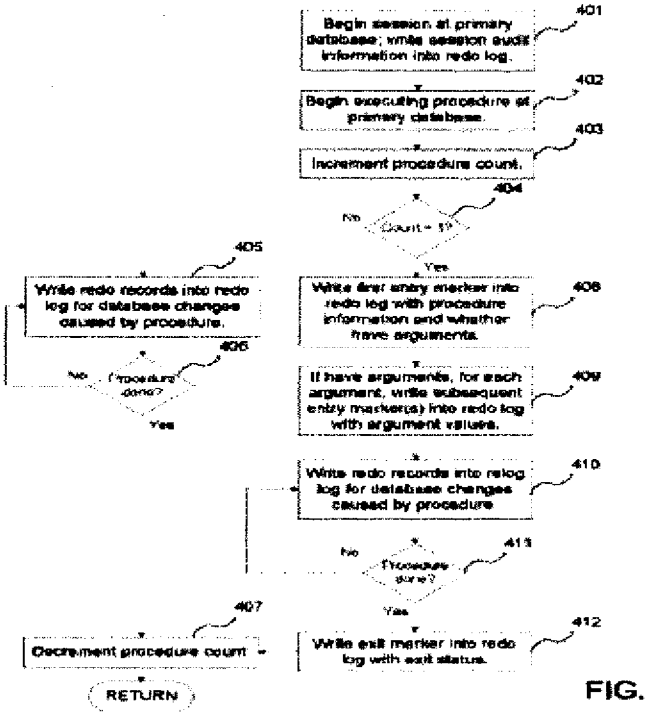

FIG. 4 ”

Signed and Sealed this
Twenty-first Day of October, 2014

Michelle K. Lee

Michelle K. Lee
*Deputy Director of the United States Patent and Trademark Office* insert --

--, therefor.

In the Specification:

In column 5, line 10, delete "form" and insert -- from --, therefor.